United States Patent [19]

Boillat

[11] Patent Number: 4,683,409

[45] Date of Patent: Jul. 28, 1987

[54] STABILIZING ARRANGEMENT FOR A STEPPING MOTOR

[75] Inventor: Pierre Boillat, Meyriez, Switzerland

[73] Assignee: Sodeco-Saida AG, Murten, Switzerland

[21] Appl. No.: 854,337

[22] Filed: Apr. 21, 1986

Related U.S. Application Data

[63] Continuation-in-part of Ser. No. 706,501, Feb. 28, 1985.

[30] Foreign Application Priority Data

Feb. 24, 1986 [CH] Switzerland ............... 00727/86

[51] Int. Cl.[4] .............................................. H02P 8/00
[52] U.S. Cl. ..................................... 318/696; 318/685
[58] Field of Search ................................ 318/696, 685

[56] References Cited

U.S. PATENT DOCUMENTS 4,091,316  5/1978  Friedman .................... 318/696
4,540,928  9/1985  Marhoefer .................... 318/696

Primary Examiner—William M. Shoop, Jr.
Assistant Examiner—Saul M. Bergmann
Attorney, Agent, or Firm—Marmorek, Guttman & Rubenstein

[57] ABSTRACT

A pulse-width modulator is used to control the sequence generator of a stepping motor to stabilize the stepping motor. One input to the pulse-width modulator is a cyclic sequence of pulses. The other input to the pulse-width modulator is an error-correction signal. The error-correction signal is proportional to variations about an average of the sum of the currents produced by the sequence generator. The error-correction signal is used by the pulse-width modulator to modulate the duration of individual pulses in the cycle sequence of pulses to produce a sequence of pulses of variable duration. The pulses of variable duration serve to control the sequence generator and stabilize the stepping motor.

11 Claims, 14 Drawing Figures

4,683,409

STABILIZING ARRANGEMENT FOR A STEPPING MOTOR

REFERENCE TO PRIOR APPLICATION

This is a continuation-in-part-application of Ser. No. 706,501, filed Feb. 28, 1985 having the same applicant and assignee as the instant application. The parent application Ser. No. 706,501 has been allowed.

FIELD OF THE INVENTION

This invention relates to a stabilizing arrangement for a stepping motor. Stepping motors are used for instance in printers, drawing devices, floppy-drivers and hard-disc-drivers.

BACKGROUND OF THE INVENTION

In Friedman U.S. Pat. No. 4,091,316 a method and apparatus is disclosed for avoiding vibrations and loss of synchronism of stepping motors. In the Friedman reference, a tachometer is used as a generator of actual values and a control circuit is used to control, i.e. modulate, the phase angle of the control pulses of the stepping motor.

The object of the present invention is to provide a stabilizing arrangement for a stepping motor to accomplish the following:

to operate one- or multiphased stepping motors stably within their parametric resonance bands without using probes, for example hall-probes, induction coils, expensive tachometers, mechanical or optical probes and their associated couplings. Preferably, the stabilization is without dead time, is relatively fast and independent of load, i.e. the stabilization bears easily changes of load from one to one hundred, to work in an extremely large speed-range from zero to 35,000 revolutions per minute to improve the efficiency of the stepping motor when the power output is high and thus render possible high mechanical power to provide a stepping motor that is independent of the particular type of sequence generator, e.g. constant voltage, constant current, chopper, bilevel or L/R control, including FS, HS, and microstepping mode. Is independent of the phase number: 1, 2, 3, n phases to stabilize the stepping motor when its movement is steady or accelerated, to provide a stabilizing arrangement whose price is reasonable compared to the price of the stepping motor, to operate two or more parallel switched stepping motors with one single stabilizing apparatus.

A stabilizing arrangement which achieves the forgoing objectives will render possible the use of smaller, i.e. cheaper stepping motors and will enable the use of stepping motors for purposes, where until now only stable use of D.C. motors was possible. Preferably, the stabilizing apparatus is built so that it can be switched as an interface-circuit between the normally already existing elements of the control apparatus of a stepping motor without the control apparatus having to be substantially changed.

SUMMARY OF THE INVENTION

The present invention is a stabilizing arrangement for a stepping motor, illustratively a multiphase stepping motor. The stepping motor includes a sequence generator which generates phase currents to operate the stepping motor.

The stepping motor is stabilized by constantly summing the phase currents produced by the sequence generator and converting the summed current to a proportional voltage. The average value of the proportional voltage is obtained by means of a low pass filter. Variations about this average are obtained by a high pass filter and serve as an error-correction signal for the stepping motor. These variations are a measure of oscillation of the load angle of the stepping motor. These variations are advantageously used as an error-correction signal because they reach a maximal value just before the stepping motor loses its synchronism.

The sequence generator in the stepping motor may be controlled by a sequence of pulses or a sequence of trailing edges of pulses.

The duration between the individual sequence generator control pulses or sequence generator control trailing edges is modulated by the error correction sequel. This is accomplished by means of a delay element.

A cyclic sequence of pulses is fed into one input of a delay element and the error correction signal is fed into the other input. The error correction signal modulates the duration of individual pulses in the cyclic sequence so that the output of the delay element comprises a sequence of duration modulated pulses. The duration modulated pulses control the sequence generator. The sequence generator may be controlled by the trailing edges of the duration modulated pulses. Alternatively, the trailing edges may be used to generate a set of pulses which are inputs to the sequence generator.

BRIEF DESCRIPTION OF THE DRAWINGS

The same reference numbers characterize the same parts in all figures of the drawing. Elements that are optional in particular embodiments of the invention, are depicted with dotted lines.

DETAILED DESCRIPTION OF THE INVENTION

Figure 1:
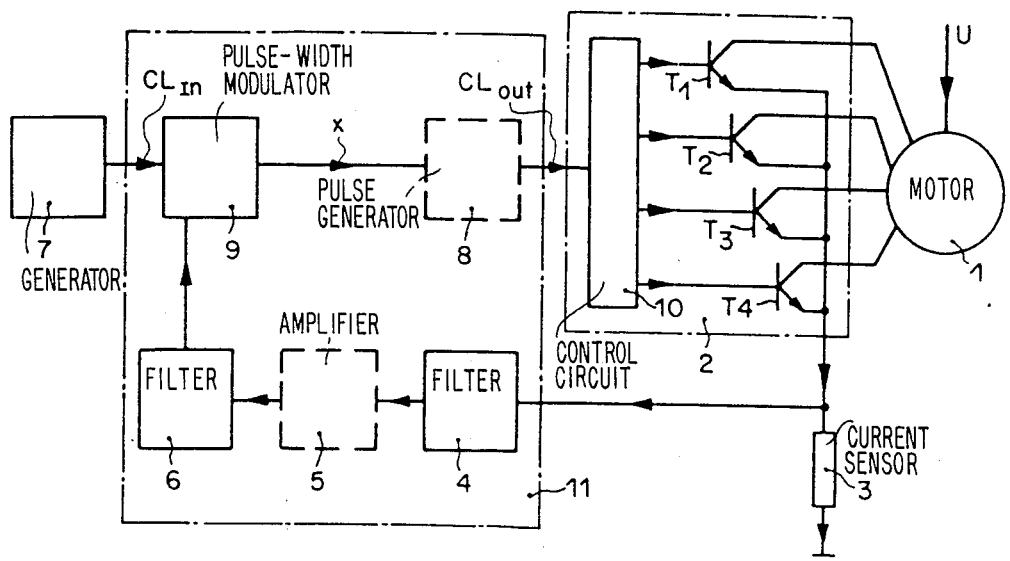
FIG. 1 shows a block diagram of a stabilizing arrangement for a stepping motor, in accordance with an illustrative embodiment of the invention, FIG. 2 plots 2A through 2D illustrate the various control signals of the stepping motor as functions of time.

The stabilizing arrangement shown in FIG. 1 contains at least:
- stepping motor 1, that is fed by a D.C. voltage U,
- a sequence generator 2,
- a current sensor 3,
- a low pass filter 4
- an optional amplifier 5,
- a high pass filter 6,
- a cycle generator 7,
- an optional pulse generator 8 and
- a controllable delay element 9.

The stepping motor 1 has an arbitrary number of phases. In the drawings the stepping motor 1 is a four-phase stepping motor. In this case the sequence generator 2 comprises four outputs connected with the stepping motor 1. The outputs are for instance "open collector" outputs. This means, the output of the sequence generator 2 is generated by four bipolar transistors, T1, T2, T3 and T4. The collectors of the four transistors T1, T2, T3 and T4 form the four outputs of the sequence generator 2. The base of each transistor T1, T2, T3, and T4 is connected with one of the four outputs of a sequence control circuit 10. The input of the sequence control circuit 10 forms the input of sequence generator 2. The emitters of the four bipolar transistors T1, T2, T3 and T4 are connected to each other within the sequence generator 2. Such sequence generators as such are known and available commercially.

The pole of the D.C. voltage U that is not connected to the stepping motor 1 is grounded. In this case also a first pole of a precision resistor for measurement purposes is grounded. This precision resistor is used as a current sensor 3.

Single pole connections are formed as follows:
- the emitters of bipolar transistors T1, T2, T3 and T4 are connected with the second pole of current sensor 3 and with the input of the low-pass filter 4,
- the output of low pass filter 4 is connected with the input of optional amplifier 5 or, if the amplifier 5 is not utilized, with the input of high pass filter 6,
- the output of amplifier 5 is connected with the input of high pass filter 6, if the amplifier 5 is utilized,
- the output of high pass filter 6 is connected with a first control input of the delay element 9,
- the output of the cycle generator 7 is connected with a second control input of the delay element 9,
- the output of the delay element 9 is connected with the input of the optional pulse generator 8 or, if the pulse generator is not utilized, with the input of sequence generator 2 and
- the output of the pulse generator 8, if it is utilized, is connected with the input of sequence generator 2.

Thus the delay element 9 is, on the one hand, controlled by the current sensor 3 by way of the low pass filter 4 and the high pass filter 6, with a signal that is used as a error-correction signal, and on the other hand, the delay element 9 is directly connected with the output of the cycle generator 7. The cycle generator 7 is a rectangular waveform generator, for instance an astable multivibrator. The low pass filter 4 serves for production of the avarage value of the output voltage of current sensor 3 and for production of a 90° phase shift of the average value. The order of the optional amplifier 5 and of the high pass filter 6 can be exchanged, i.e. the amplifier 5 can also be on the output side of the high pass filter 6.

Both filters 4 and 6 are, for instance, known L-shaped RC-elements. In the low pass filter 4 (see FIG. 9) a resistor is arranged in the arm of the "L" which connects the input to the output of the low pass filter and a capacitor is arranged perpendicular thereto. In the high pass filter 6, the capacitor is arranged in the arm of the "L" connecting the input to the output and the resistor is arranged perpendicular thereto. In the simplest case, the high pass filter 6 comprises only capacitor. Then a pole of this capacitor forms the input and the other pole of this capacitor forms the output of the high pass filter 6. If the amplifier 5 does not exist between the low pass filter 4 and the high pass filter 6, the high pass filter 6 can be combined with the low pass filter 4. Thus in this case, the low pass filter 4 and the high pass filter 6 form a single band pass filter.

Preferably, the pulse generator 8 is a known and commercially available mono-stable multivibrator and is for instance controlled with the trailing edges of pulses. The pulse generator 8 is only used when the sequence generator 2 is controlled by pulses. However if the sequence generator is controlled by pulse edges, then the pulse generator 8 can be left out.

Figure 2:
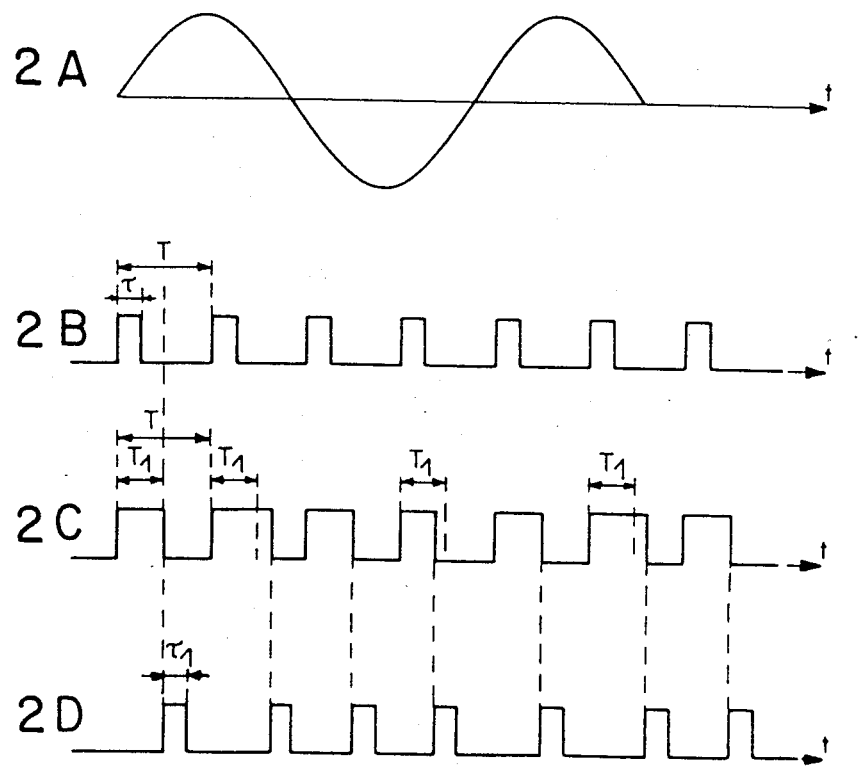

FIG. 2A is a plot of the AC part of the average of the sum of all phase currents of a stepping motor as a function of time t. For purpose of simplicity, the curve of FIG. 2A is assumed to be sine-shaped.

FIG. 2B is a plot of the output signal of cycle generator 7 as a function of time t. It comprises a series of rectangular pulses of duration $\tau$ and of period $T = 1/f$, where f characterizes the cycle frequency. T for example equals 1 ms.

FIG. 2C is a plot of the output signal of the delay element 9 as function of time t. It comprises of a series of rectangular pulses of period T whose duration is modulated. $T_1$ is the delay time of the delay element 9, when the A.C. part of the average value of the sum current of the phase currents, (i.e. the modulation), equals zero. In other words, the AC part of the average value of the sum of the sequence generator phase currents (FIG. 2A) is used to modulate the duration of the pulses in FIG. 2B to obtain the pulses of FIG. 2C.

FIG. 2D is a plot of the output signal of the pulse generator 8 as a function of time t. It comprises a series of rectangular pulses of duration $\tau_1$. The leading edges of these pulses correspond in time with the trailing edges of the pulses shown in FIG. 2C.

Advantageously $T_1$ and T are chosen such that $T_1 \approx t/2$. The pulse duration $\tau$ and the pulse duration $\tau_1$ are to be chosen to be significantly smaller than the delay time $T_1$.

Figure 3:
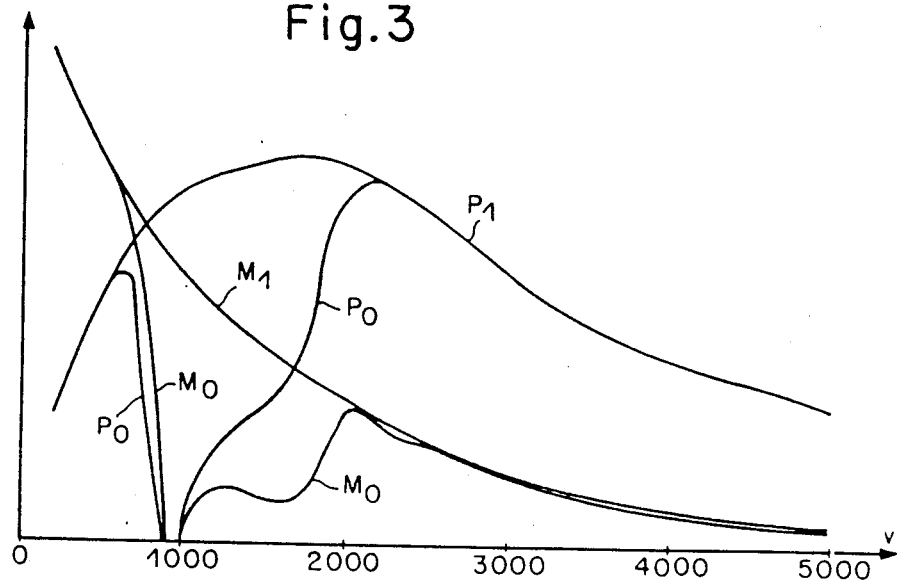
FIG. 3 is a plot of the torque and of the mechanical power of a stepping motor as a function of the stepping speed with and without stabilization, FIG. 4 a block diagram of a delay element, FIG. 5 a block diagram of a saw-tooth generator, FIG. 6 a diagram of an attenuator element, FIG. 7 a diagram of a controllable current source, FIG. 8 a diagram of an impedance transformer, FIG. 9 a diagram of a low-pass filter, FIG. 10 a diagram of a control amplifier, FIG. 11 a diagram of a logic circuit for reproduction of suppressed pulses, FIG. 12 a diagram of a variant of an output logic circuit for reproduction of suppressed pulses, FIG. 13 a pulse diagram for the arrangement without suppressed pulses and FIG. 14 an pulse diagram for the arrangement with suppressed and reproduced pulses.

In FIG. 3, the four curves $M_0$, $M_1$, $P_0$ and $P_1$ are shown as functions of stepping speed v of stepping motor 1. Line $M_0$ shows the torque of stepping motor 1 without stabilization, $M_1$ shows the torque when stabilization exists, $P_0$ shows the mechanical power of stepping motor 1 without stabilization and $P_1$ shows the power when stabilization exists.

The torque $M_0$ has a torque collapse at approximately 1000 steps per second, and the power $P_0$ has a maximum below 1000 steps per second. This maximum value is significantly smaller than the maximum value of power $P_1$, which lies at over 1000 steps per second. The torque $M_1$ sinks continually without break when the step speed is accelerating.

In stepping motors, abrupt torque losses happen at high speeds in certain frequency ranges. The stepping motor may fall out of step and come to a stop. This reaction is explainable by parameter resonances of the stepping motor, because the rotor of the stepping motor undergoes oscillatory as well as rotational motion. The amplitudes of the oscillations increase very much in these critical frequency ranges and may become so strong, that the stepping motor loses its synchronism and may come to a stop.

The stepping motor is characterized by its torque. Theoretically, when the stabilization does not exist, the torque has several breaks within the frequency range between zero to 20 kHz. In practice though the torque has at least one break, which lies, for instance, at approximately 1000 steps per second, as shown by curve $M_0$ in FIG. 3 (so called "pull out" area). This results in the stepping motor being usable only at low speeds, for instance below 1000 steps per second, when the stabilization does not exist. This is a speed range, where the mechanical power of the stepping motor is relatively small (see curve $P_0$ of FIG. 3) thus limiting applicability of the stepping motor.

Various approaches to stabilizing of the stepping motor where no probes or couplings are necessary, are normally not usable for reasons of price and/or space. A tachometer for instance costs a multiple of the price of an inexpensive stepping motor, for instance a "tin can" stepping motor. Also normally, there is no space for a space consuming coupling. In this invention, the stepping motor itself is used as a probe in order to find the error correction signal for a control circuit. In the present invention, the deviation from a desired speed is not used, as in prior art, as an error correction signal. Instead the oscillation of the load angle around the nominal load angle is used as an error-correction signal. This has the advantage, that the stabilization of the stepping motor is independent of load.

In the stable range of the stepping motor and with given load, the envelope curve of its phase currents and thus also the average value of the phase currents is approximately constant. In the unstable area however, oscillations of the envelope curve and thus also of the average value of the phase current happen. These oscillations are a measure of the oscillations of the load angle around the nominal load angle.

In the arrangement shown in FIG. 1, the stability of stepping motor 1 is increased with the help of a feedback signal that modulates the phase of control pulses produced by the sequence generator of the stepping motor 1. This is done by constantly finding the sum of the phase currents of stepping motor 1 with the help of current sensor 3. This sum current is then changed into a proportional voltage, and its average value is produced with the help of low pass filter 4. Since the individual phase currents of stepping motor 1 occur almost successively, the voltage that occurs at the current sensor 3 is almost proportional to the individual phase current of stepping motor 1 flowing at this instance. The variations of the average value that is obtained by way of low pass filter 4 are a measure of the oscillation of the load angle of stepping motor 1. The variations of this average value that can have a frequency between e.g. 0 to 400 Hz are independent of the average value and thus independent of the nominal load angle. An advantage of this use of the variations of the average value as an error-correction signal is, that it has its maximum value shortly before the stepping motor 1 reaches its critical point, i.e. before the stepping motor 1 loses its synchronism, because at this moment the load angle is at its peak. This is in contradiction to prior art, where the actual value of the speed variation is smallest at this moment, i.e. almost zero.

The value of the output signal of the low pass filter 4 depends on the value of the measure resistor 3 and on the value of the phase currents. Normally it is 100 to 1000 times smaller than the D.C. voltage U, that feeds the stepping motor 1. If the value of the output voltage of the low pass filter 4 is not sufficient to operate the following control circuit, then the amplifier 5 is switched between the low pass filter 4 and the high pass filter 6 (see FIG. 1). The amplifier 5 amplifies the A.C. voltage part, i.e. the variations of the phase-shifted average value, before these variations phase-modulate the control pulses of the stepping motor 1. p When the amplifier 5 is not used, the high pass filter 6 eliminates the D.C. voltage component of the average value. When the amplifier 5 that is connected in series does exist, then the high pass filter 6 eliminates the "output-offset" voltage of the amplifier, so that in any case, only the possibly amplified variations of the average value are found. These variations are inputted to the first control input of the delay element 9. Thus they phase modulate the control pulses of stepping motor 1 that are produced by the sequence generator 2.

Since, as is known, a frequency is proportional to $d\phi/dt$, where $\phi$ is a phase, and since taking the derivative, causes a phase shift of 90°, the average value of the output voltage of the current sensor 3 must be phase shifted in the low pass filter 4 by about 90° before its variations phase modulate the control pulses of stepping motor 1. This happens in a simple and elegant manner: the phase shift caused by the low pass filter 4 is adjusted to equal 90° by appropriate design of the low pass filter 4. Then the error-correction signal at the output of the high pass filter 6 has the correct phase needed for the modulation of the control pulses of the stepping motor. The error correction signal (FIG. 2A) time—modulates the trailing edges of the excitation pulses shown in FIG. 2B, by means of pulse-width modulator 9 (see FIG. 2C). In other words, the duration of the pulses produced by the generator 7 (FIG. 2B) are modulated by the error-correction signal (FIG. 2A) in the pulse-width modulator 9 to produce the pulses of modulated duration shown in FIG. 2C. If the following sequence generator 2 is edge controlled (e.g. controlled by trailing edges), then the output signal of the pulse-width modulator 9 can control the sequence generator 2 directly. If not, the trailing edges of the output pulses of the delay element 9 (FIG. 2C) are utilized by pulse generator to form the pulses of FIG. 2D which pulses control the sequence generator 2 of the stepping motor. The pulse generator 8 produces for instance a pulse of constant duration $\tau_1$ in response to each trailing edge of its input signal (see FIG. 2D).

In order to reach maximum modulation swings in the positive and negative direction, the delay period $T_1$ of the pulse-width modulator 9 is chosen so that, when the error-correction signal at the output of high pass filter 6 is zero, the controlling, e.g. the trailing, edge of the pulse at the output of pulse-width modulator 9 lies almost in the middle of two successive output pulses of the cycle generator 7.

The arrangement shown in FIG. 1 has the advantage, that the cycle generator 7 is generally not voltage controlled. Normally, a non voltage controlled cycle generator 7, a sequence generator 2 and a current sensor 3 are generally found with already existing stepping motors, so that, in order to stabilize the use of stepping motor 1, only an "interface" circuit 11 must be inserted between the already existing cycle generator 7 and an also already existing combinations 2;3 of the sequence generator 2 and of the sequence sensor 3. This "interface" circuit 11 comprises the low pass filter 4, the optional amplifier 5, the high pass filter 6, the pulse-width modulator 9 and the optional pulse generator 8.

Figure 4:
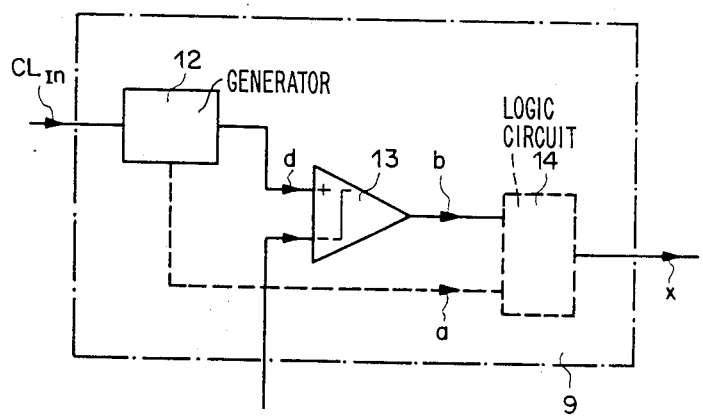

The pulse-width modulator 9 shown in FIG. 4 comprises at least a controllable saw-tooth generator 12 for production of a saw-tooth signal d of a constant amplitude and a comparator 13 for comparison of the saw-tooth signal d with the error correction signal produced by the high pass filter 6. The error correction signal is received at the first input of the pulse-width modulator 9. The inverting input of the comparator forms the first control input and the control input of the saw-tooth generator 12 forms the second control input of the pulse-width modulator 9. The output of the saw-toothed generator 12 (i.e. the saw-tooth signal d) is connected to the non inverting input of the comparator. The output of this comparator is connected to the output of the pulse-width modulator 9 over a first input of a logic circuit 14 that optionally exists at the output of the pulse-width modulator 9.

If the logic circuit 14 is utilized, then a cycle (i.e. periodic) output of the saw-tooth generator 12, i.e. the signal a, (see FIGS. 13 and 14) is connected to a second input of the logic circuit 14, so that the logic circuit 14 is fed from the saw-tooth generator 12 with a cycle signal a. The output signals of the comparator 13 and the pulse-width modulator 9 are designated by the letters b and x respectively. If the logic circuit 14 is not utilized, then the output of the comparator 13 is connected directly to the output of the pulse-width modulator 9.

The pulse-width modulator 9 shown in FIG. 4 functions as follows: The saw-tooth generator 12 transforms the rectangular output pulses of the cycle generator 7 into saw-tooth pulses. Each time the value of one of the saw-tooth pulses have reached the value of the error-correction signal positioned on the first control input of the pulse-width modulator 9, the comparator 13 changes state. The duration of the rectangular pulses appearing thus at the output of the arrangement 13 is proportional to the error-correction signal.

The saw-tooth generator 12 produces saw-tooth pulses of a constant amplitude. The frequency of the cycle pulse generator 7 may increase as the stepping motor accelerates. If, for a short time, the variable input frequency of the saw-tooth generator 12 is to big when the stepping motor 1 accelerates, then, for a shot time, the saw-tooth generator 12 has no time to produce saw-tooth pulses of a constant amplitude. That means, the amplitude of the saw-tooth may be lower than the threshold value of comparator 13, so that several of the comparator output pulses are not produced and thus suppressed. As is discussed below, the logic circuit 14—serves to regenerate these suppressed output pulses of comparator 13.

Figure 5:
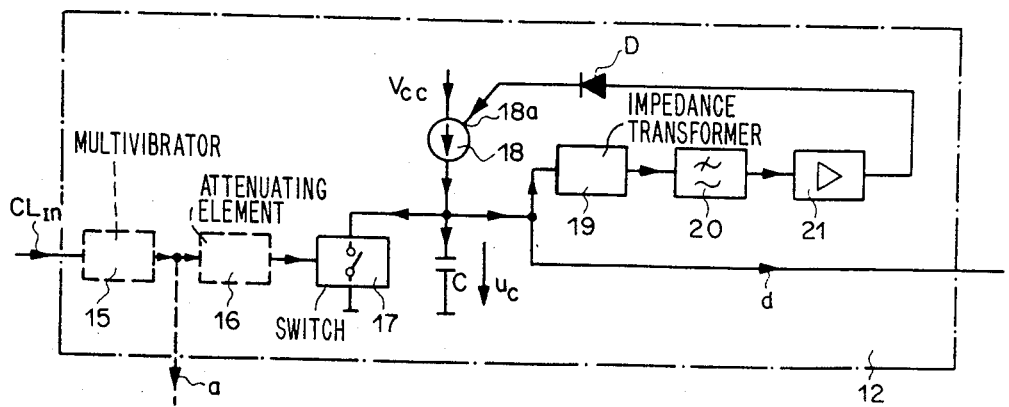

A saw-tooth generator 12 used in the pulse-width modulator 9 is shown in FIG. 5. It comprises an optional mono-stable multivibrator 15, an optional attenuating element 16, a controllable switch 17, a capacitor C, a controllable current source 18, an impedance transformer 19, a low pass filter 20, a control amplifier 21 and a diode D. The current source 18 and the capacitor C together form an integrator 18;C. The switch 17, that for instance is a bipolar transistor, is connected parallel to the capacitor C, while the current source 18 is connected in series to the capacitor C. The mutual terminal of the current source 18 and of the capacitor C is the input of a control device 19;20;21. The output of the control device 19;20;21 is connected to a control input 18a of the controllable current source 18 by way a diode D. The mutual terminal of the current source 18 and capacitor C also forms the output of the saw-tooth generator 12.

The control device 19;20;21 comprises—in the given order—the impedance transformer 19, the low pass filter 20 and the control amplifier 21. The output of the control device 19;20;21 is connected to the anode and the control input 18a is connected to the cathode of diode D. Diode D prevents a reverse flow of current from the current source 18 to the control amplifier 21. The second terminal of the capacitor C is for instance grounded and one terminal of current source 18 is connected to a positive D.C. supply voltage $V_{CC}$. The second pole of the D.C. supply voltage is not shown and is grounded. The input of the optional mono-stable multivibrator 15 forms the control input of the saw-tooth generator 12, while its output forms the cycle output of the saw-tooth generator 12. The cycle signal a is obtainable at the output of the mono-stable multivibrator 15. The output of the optional mono-stable multivibrator and attenuating element 15;16 is connected to the control input of switch 17. Thus the control input of the controllable switch 17 is connected directly or by way of the optional attenuating element 16 and/or the optional mono-stable multivibrator 15 to the input of the controllable saw-tooth generator 12.

If the pulses of the input signal $CL_{In}$ of the controllable saw-tooth generator 12 do not have sides of unlimited slope (do not have vertical sides), then use of the mono-stable multivibrator 15 may be necessary. The mono-stable multivibrator 15 serves as a pulse generator and it regenerates the edges of the pulses of the input signal $CL_{In}$ in such a manner that rectangular pulses result. These pulses form the cycle signal a at the output of the mono-stable multivibrator 15 (see FIGS. 13B and 14B). The mono-stable multivibrator 15 is, for instance, a commercially available element.

Figure 6:
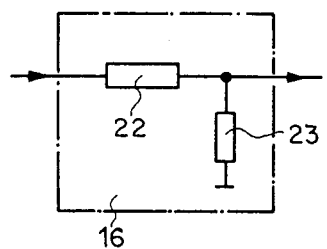

If necessary, the attenuating element 16 which, for instance, comprises a voltage divider 22;23 (see FIG. 6) adjusts the amplitude of the cycle signal a to the required amplitude of the cycle signal of the controllable switch 17. In case switch 17 is a bipolar transistor, then this control signal is, for instance, a base/emitter voltage of this transistor. According to FIG. 6 the voltage divider 22;23 comprises two resistors 22 and 23. Their mutual connection forms the output of the attenuating element 16. The second connection of the resistor 22 then forms the input of the attenuating element 16 and the second connection of resistor 23 is, for instance, grounded.

If the switch 17 is open, the current source 18 feeds the capacitor C with a constant current, so that the capacitor voltage $u_C$, i.e. the saw-tooth signal d, climbs linearly. As soon as a pulse appears at the input of the saw-tooth generator 12, the switch 17 is closed for the duration of this pulse, so that the capacitor C can discharge itself very fast by way of the closed switch 17 that serves as a short-circuit. That way the capacitor C produces the trailing edges of the capacitor voltage $u_C$ and thus also the trailing edges of the pulses comprising the saw-tooth signal d.

Figure 7:
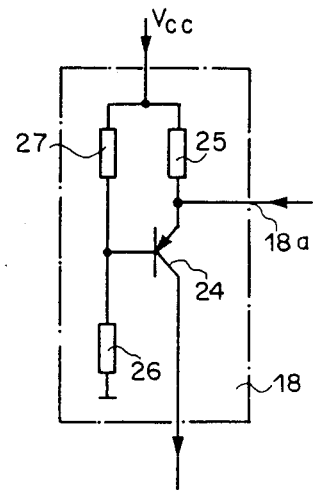

The construction of the current source 18 can be seen in FIG. 7. It comprises a bipolar transistor 23 and three resistors 25, 26 and 27. Resistor 26 is the emitter resistor of the transistor 24. Their mutually connection forms the control input 18a of the controllable current source 18. Resistors 26 and 27 are connected in series. Their mutual connection forms a voltage divider output that is connected with the base of transistor 24. The resistors 25 and 27 are also connected to the D.C. supply voltage $V_{CC}$, while the resistor 26 is grounded. The collector of the transistor 24 forms the output of the current source 18. This output is connected externally to a terminal of the capacitor C.

Figure 8:
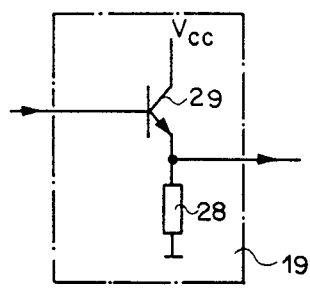

The control device 19;20;21, the diode D and the controllable current source 18 together form a kind of control loop 19;20;21;D;18. Its purpose is to control the amplitude of the capacitor voltage $u_C$ and thus the amplitude of the saw-tooth signal d to a constant value. The impedance transformer 19 that preferably is an emitter follower 28;29 (see FIG. 8) serves to prevent a stress on the capacitor C by the control device 19;20;21, because the input resistance of the impedance transformer 19 is high-Z. According to FIG. 8, the emitter follower 28;29 comprises a resistor 28 and a bipolar transistor 29. The resistor 28 is the emitter resistor of the transistor 29. The mutual connection of the transistor 29 and the resistor 28 forms the output and the base of the transistor 29 forms the input of the emitter follower 28;29. The collector of the transistor 29 is connected to the D.C. supply voltage $V_{CC}$, while the second connection of resistor 22 is grounded.

Figure 9:
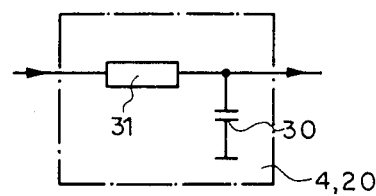

The low pass filter 20 has, for instance, the same construction as the low pass filter 4 and thus, as shown in FIG. 9, comprises a capacitor 30 and a resistor 31. Their mutual connection forms the output of the low pass filter 4. The second connection of the resistor 31 is the input of the low pass filter 4, and the second connection of the capacitor 30 is grounded. The low pass filter 20 forms the average value of the capacitor voltage $u_C$ and thus of the saw-tooth signal d. By way of the control amplifier 21, the diode D and the control input 18a of the current source 18, this average value influences the current source 18 in such a manner, so that, when, for example, the average value is too low, the capacitor charging current delivered by the current source 18 increases. The increased capacitor charging current, increases the steepness of the positively sloped edges of the saw-tooth signal d.

Figure 10:
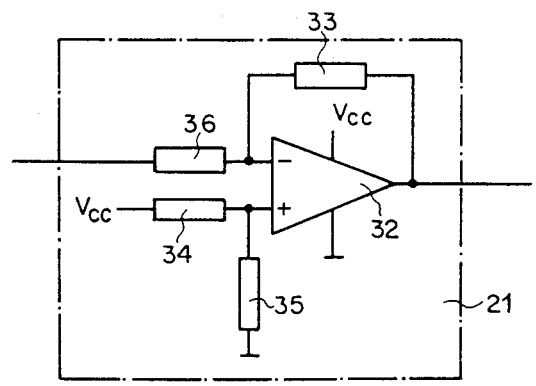

The control amplifier 21 is at the same time a control amplifier and an impedance transformer. It has an amplification factor of at least one. In accordance to FIG. 10 the control amplifier 21 is constructed with the help of an operational amplifier 32, that is connected as an inverting amplifier 32;33;34;35;36. The inverting amplifier contains four resistors 33, 34, 35 and 36. The two resistors 33 and 36 on one hand and the two resistors 34 and 35 on the other hand are each connected in series and form a voltage divider. The mutual connection of resistors 33 and 36 is connected to the inverting input of the operational amplifier 32 and the mutual connection of resistors 34 and 35 is connected to the noninverting input of the operational amplifier 32. The second connection of the resistor 33 is connected to the output of the operational amplifier 32, that at the same time is the output of the control amplifier 21. The second connection of resistor 34 is connected to the DC supply voltage $V_{CC}$ and the second connection of resistor 35 is connected to ground. The second connection of the resistor 36 forms the input of the control amplifier 36.

Figure 13:
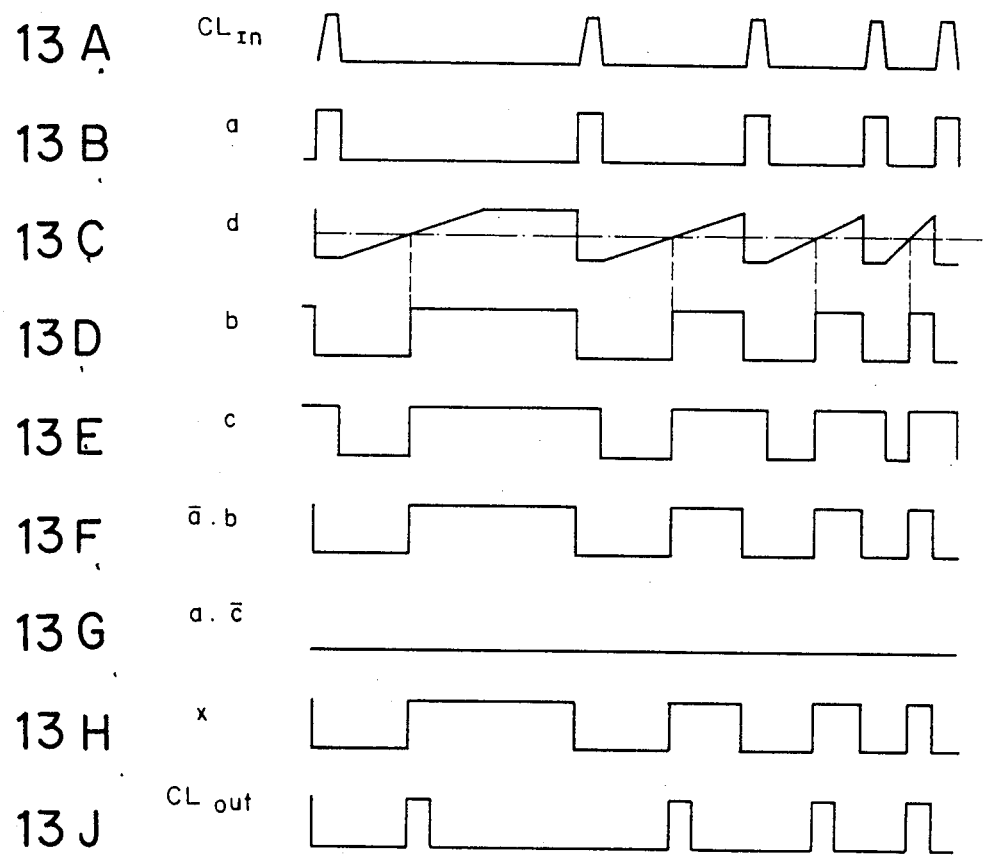

When the stepping motor 1 is accelerating, the frequency of the input signal $CL_{In}$ of the saw-tooth generator 12 (see FIGS. 13A and 14A) and thus also the cycle signal a (see FIGS. 13B and 14B) are not constant but are increasing in frequency during the acceleration. In FIG. 13 it is assumed that the saw-tooth generator 12 has, despite the increasing input frequency, enough time to produce a saw-tooth signal d (see FIG. 13C) of constant amplitude. This causes the threshold value of the comparator 13 (see FIG. 4) to be exceeded. Thus at the output of comparator 13, the rectangular pulses of the output signal b are produced for each saw-tooth pulse without suppression of any pulses in signal b (see FIG. 13D). The existence of logic circuit 14 (see FIG. 4) is then superfluous and the output signal b equals the output signal X of the delay element 9 (see FIGS. 4 and 13H). In FIG. 13J it is assumed that the leading edges of the output signal X (see FIG. 13H) are transformed into the rectangular pulses of constant duration of the control signal $CL_{out}$ by the pulse generator 8 (see FIG. 1).

If, during acceleration of the stepping motor 1, the acceleration rate of the input frequency of the saw-tooth generator 12 is larger than a certain value, e.g. $1.7 \times 10^5$ steps per second$^2$, then after a certain moment the saw-tooth generator 12 does not have enough time to control the amplitude of the saw-tooth pulse to a constant value. The value of the amplitude of each saw-tooth pulse falls and can fall below the threshold value of the comparator 13. This case was assumed in FIG. 14C for the last two saw-tooth pulses. Since these pulses do not exceed the threshold value of the comparator, they do not produce any rectangular pulses in the output signal b at the output of comparator 13 (see FIG. 4). The last two pulses of the output signal b are thus missing in FIG. 14D. If the logic circuit 14 (see FIG. 4) did not exist, the last two pulses of the control signal $CL_{out}$ would also be missing in FIG. 14.

Figure 11:
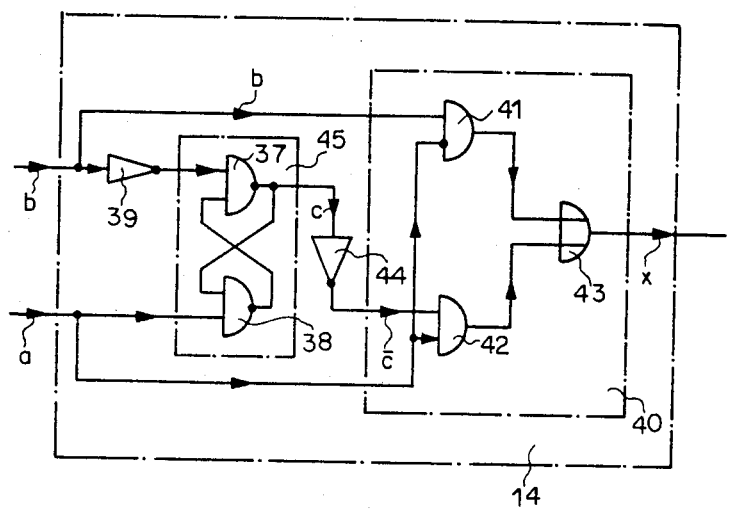

According to FIG. 11, the logic circuit 14 comprises two logic gates of the same type, for instance, two Nand-gates 37 and 38, a first inverter 39, an output logic circuit 40 (which itself comprises two And-gates 41 and 42 and an Or-gate 43) and a second inverter 44. The two logic gates of the same type can be Nand-gates or Nor-gates. The gates 37, 38 are both inter connected as an RS-flip flop 45, i.e. one input of one of the gates 37,38 forms the R-input and one input of the other gate 37,38 forms the S-input of the RS-flip flop 45, while a second input of each of these logic gates is connected to the output of the other logic gate. The output of one of these two logic gates is at the same time the output of the RS-flip flop 45.

The output of the RS-flip flop 45 is connected to the first input of the output logic circuit 40 by way of the inverter 44. The input of the logic circuit 14 that is connected externally to the output of comparator 13 to receive the output signal b of comparator 13 is, on one hand, connected to a first input of the RS-flip flop 45 by way of the inverter 39 and, on the other hand, is connected directly to a second input of the output logic circuit 40. The cycle signal a is connected to an input of the output logic 40 and to a second input of the RS-flip flop 45. The first input of the output logic circuit 40 is formed by a first input of the And-gate 42. Its second input is formed by a first input of the And-gate 41 and its third input by the inter-connected inputs of the And-gates 41 and 42. The second input of the And-gate 41 is an inverting input. The output of the And-gates 41 and 42 are each directed towards one input of the Or-gate 43. The output of the Or-gate 43 forms the output of the output logic circuit 40 and thus also the output of the logic circuit 14.

If the logic circuit 14 exists in the pulse-width modulator 9 (see FIG. 4), then in FIGS. 13F and 14F an output signal $\bar{a}.b$ of And-gate 41 and in FIGS. 13G and 14G an output signal $a.\bar{c}$ of And-gate 42 is shown. Signal c is the output signal of the inverter 44. The or-function of the output signal of the And-gates 41 and 42 equals the signal X that is shown in FIGS. 13H and 14H. In other words, signal X is the output signal of the logic circuit 14.

If no pulses are suppressed (see FIG. 13), then the output signal $a.\bar{c}$ equals zero, i.e. is not active, according to FIG. 13G. In this case, signal b (see FIG. 13D) and signal $\bar{a}.b$ (see FIG. 13F) and X (see FIG. 13H) are the same. The input signal c of the inverter 44 is shown in FIG. 13E and all its leading edges correspond to those of signals b, $\bar{a}.b$ and X in time.

Figure 14:
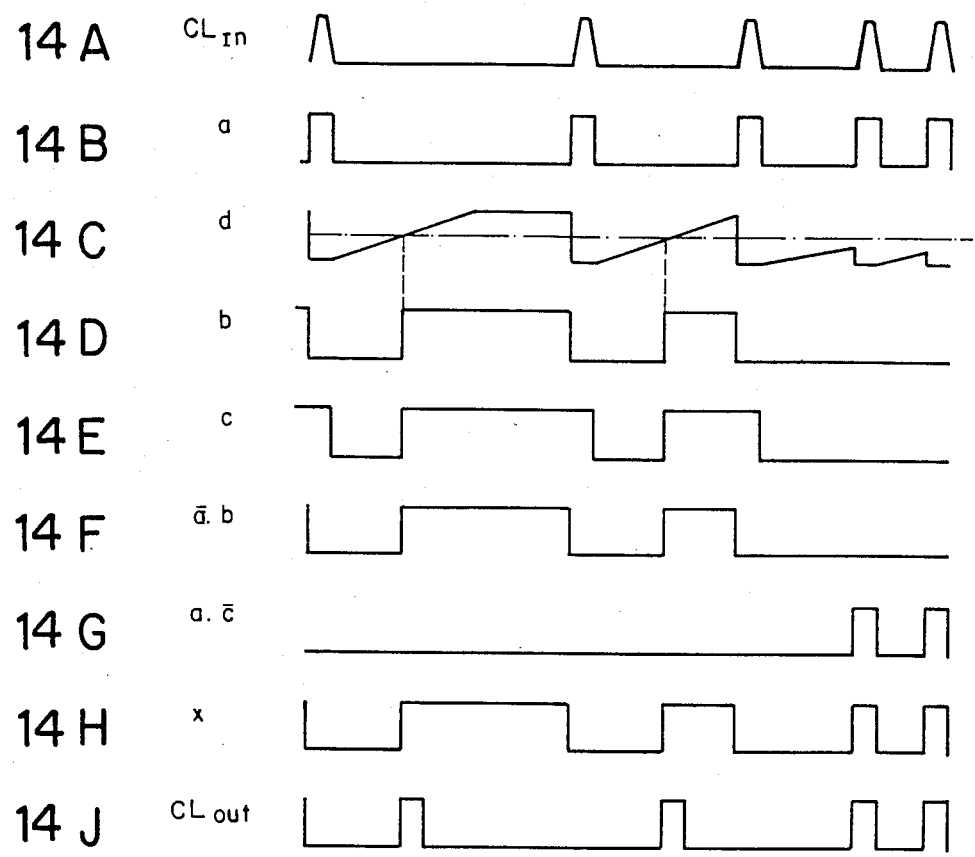

If the two last pulses of signal b are suppressed (see FIG. 14), then, according to FIG. 14G, the output signal $a.\bar{c}$ does not equal zero, but at the end of each saw-tooth (that normally does not produce a rectangular pulse) it has a rectangular pulse anyway. This results in the output signal X having a rectangular pulse at this moment (see FIG. 14H), so that the pulse suppression is removed. The input signal c of the inverter 44 is shown in FIG. 14E. Each pulse of the cycle signal a is stored in the RS-flip flip 45 and thus results in a logic value "1" as signal c at the output of the inverter 44 as long as the RS-flip flop 45 is set by signal b. If suppressed pulses exist in signal b, then this setting of the RS-flip flop does not happen and a signal $a.\bar{c}$ is produced that, as already mentioned, does not equal zero and can thus regenerate the suppressed pulses.

Figure 12:
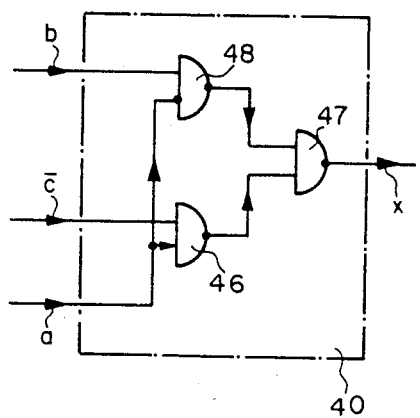

In FIG. 12, another variant of the output logic circuit 40 is shown. This time it comprises three Nand-gates 46, 47 and 48. The outputs of the Nand-gates 46 and 48 are each directed to an input of the Nand-gate 47. The output of the Nand-gate 47 forms the output of the output logic circuit 40 and thus also of the logic circuit 14. The first input of the output logic circuit 40 is formed by a first input of the Nand-gate 46, its second input by a first input of the Nand-gate 48. The third input is formed by the inter-connected second inputs of the Nand-gates 46 and 48. The second input of the Nand-gate 48 is an inverting input.

Since, as is known:

$$\bar{a} \cdot b + \bar{a} \cdot \bar{c} = \overline{(\overline{a \cdot b})(\overline{a \cdot \bar{c}})},$$

the output logic circuit 40 shown in FIG. 12 results in the same logic function as the output logic circuit 40 used in FIG. 11. A logic circuit 14 that is constructed with the output logic circuit 40 shown in FIG. 12 has the advantage of only using Nand-gates, because inverters, as is known, can be realized through the use of Nand-gates, whose inputs are interconnected.

Finally, the above described embodiments of the invention are intended to be illustrative only. Numerous alternative embodiments may be derived by those skilled in the art without departing from the spirit and scope of the following claims.

I claim:

1. A stabilizing arrangement for a stepping motor comprising:
   a pulse-width modulator for modulating control pulses of said stepping motor, said pulse-width modulator receiving an error correction signal as one input and the output of a cycle generator as the other input, said error correction signal being generated by a current sensor by way of a low pass filter and a high pass filter,
   said pulse-width modulator comprising a controllable saw-tooth generator and a comparator connected to the output of the saw-tooth generator for comparing the saw-tooth signal produced by the saw-tooth generator with the error-correction signal,
   said saw-tooth generator comprising a capacitor, a controllable switch, connected in parallel to said capacitor, a controllable current source connected in series to said capacitor, and a control device, the input of the control device being connected to said capacitor and the output of said control device being connected to a control input of the controllable current source by way of a diode, a control input of said controllable switch being connected to an input of the controllable saw-tooth generator.

2. An arrangement in accordance with claim 1 that is characterized by the control device comprising an impedance transformer, another low pass filter and a control amplifier.

3. An arrangement in accordance with claim 2 that is characterized by the impedance transformer being an emitter follower.

4. An arrangement in accordance with claim 2 that is characterized by the control amplifier being constructed with an operational amplifier that is arranged as an inverting amplifier.

5. An arrangement in accordance with claim 1 that is characterized by the input of the controllable saw-tooth generator being connected to the control input of the controllable switch over at least one attenuating.

6. An arrangement in accordance with claim 5 that is characterized by the input of the controllable saw-tooth generator being connected to the control input of the controllable switch, and to the input of the attenuating element by way of at least one mono-stable multivibrator.

7. An arrangement in accordance with claim 1 characterized by a logic circuit being connected at the outlet of said comparator, said logic circuit also being fed by a cycle signal.

8. An arrangement in accordance with claim 1 that is characterized by a logic circuit being connected to the output of said comparator, the logic circuit comprising a RS-flip flop and an output logic circuit, the output of said RS-flip flop being connected to a first input of the output logic circuit by way of an inverter, while the output of the comparator is connected on one hand to a first input of the RS-flip flop over another inverter and on the other hand to a second input of the output logic circuit, a cycle signal being directed towards a second input of the RS-flip flop and also towards a third input of the output logic circuit.

9. An arrangement in accordance with claim 8 that is characterized by the RS-flip flop being constructed with two logic-gates of the same type.

10. An arrangement in accordance with claim 8 that is characterized by the output logic circuit comprising two And-gates, the outputs of said And-gates each being directed towards an input of an Or-gate, one of the And-gates having an inverted input that is connected to an input of the other And-gate.

11. An arrangement in accordance to claim 8 that is characterized by the output logic circuit comprising two Nand-gates, the outputs of said Nand-gates each being directed towards an input of a third Nand-gate, one of the two first Nand-gates having an inverting input that is connected to the input of the other one of the two first Nand-gates.

* * * * *